Oct. 8, 1968   P. NAUMANN   3,404,614

DRIVE DEVICE FOR CAMERAS

Filed May 25, 1966   4 Sheets-Sheet 1

INVENTOR
Paul Naumann
BY  *Spencer & Kaye*
Attorneys

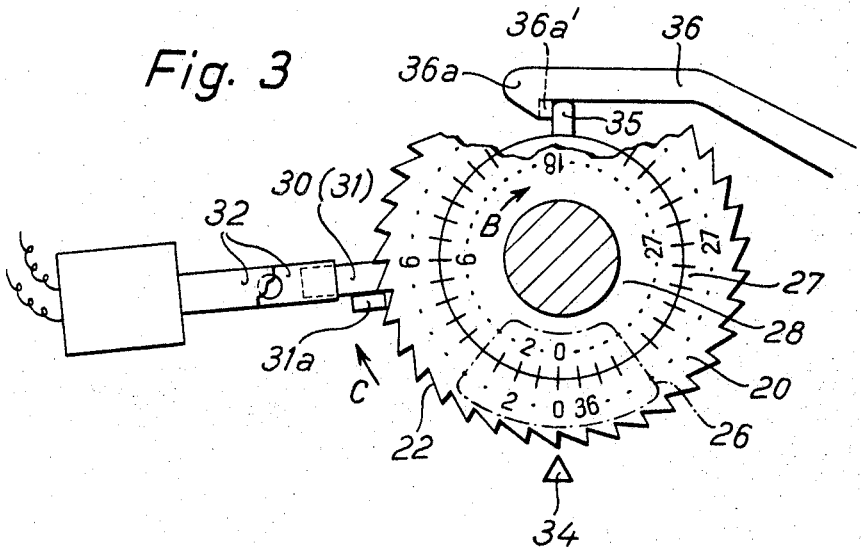
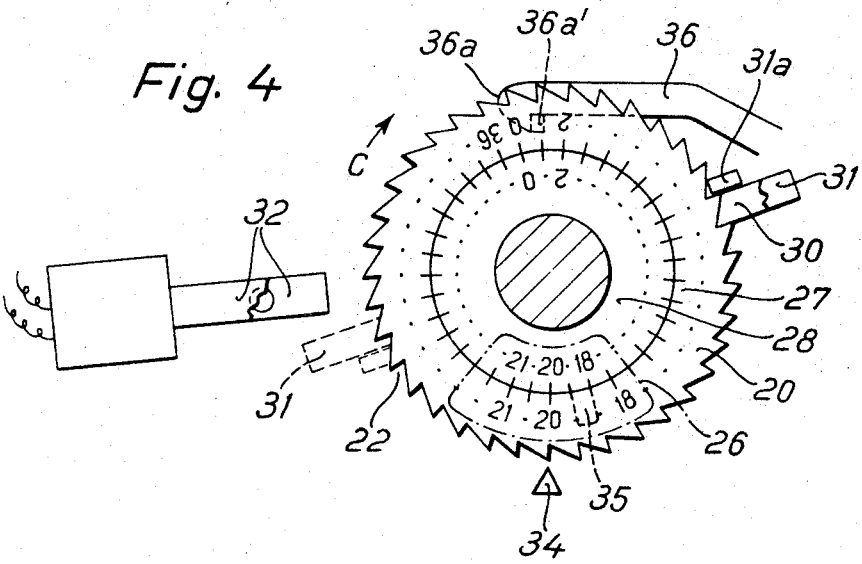

Oct. 8, 1968 P. NAUMANN 3,404,614
DRIVE DEVICE FOR CAMERAS
Filed May 25, 1966 4 Sheets-Sheet 3
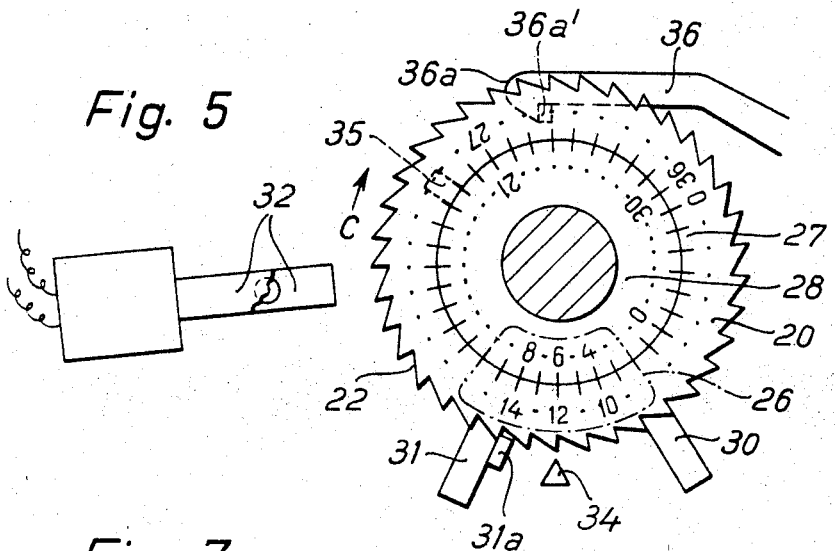
Fig. 5
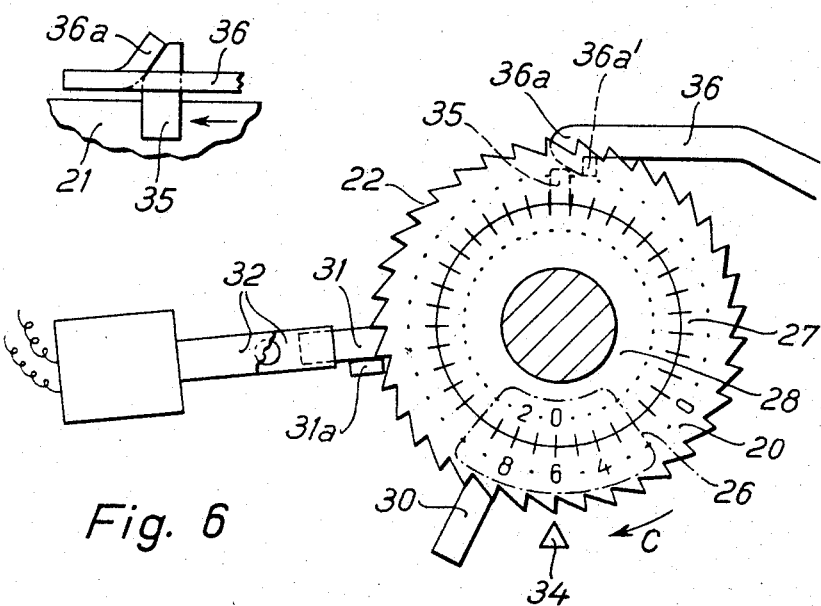
Fig. 7
Fig. 6
INVENTOR
Paul Naumann
BY Spencer & Kaye
Attorneys

United States Patent Office 3,404,614
Patented Oct. 8, 1968

3,404,614
DRIVE DEVICE FOR CAMERAS
Paul Naumann, Alkmaar, North Holland, assignor to Ernst Leitz G.m.b.H., Wetzlar, Germany
Filed May 25, 1966, Ser. No. 552,866
Claims priority, application Germany, May 28, 1965, L 50,814
8 Claims. (Cl. 95—31)

The present invention relates generally to the photographic art, and, more particularly to a camera which is equipped with an electric motor drive, which can, if desired, be of the type that is attachable to the camera, for triggering the shutter and for transporting the film for taking individual pictures or series of pictures, and which drive has associated with it its own device for counting the pictures and preselecting the number of pictures.

It is already known to equip drives of this type with a picture-counting device and to equip the same with control means which, after a predetermined number of pictures has been taken, as, for example 20 or 30, opens a switch in the electric circuit of an electric motor thereby to stop the motor.

It is also known, in the case of drives which are fashioned for taking individual pictures or a series of pictures, to provide in addition to the above-mentioned picture-counting device, hereinafter referred to as a supply counter, a series counter by means of which the number of pictures in an intended series of pictures can be preselected. This series counter device interrupts the current supply to the motor, via a switch, after the desired number of pictures has been taken.

These known devices have, however, a very serious drawback. Namely, they do not take into consideration the fact that it is very often not possible to estimate with any degree of accuracy ahead of time just how many pictures will be needed to record a certain event photographically. By way of explanation, let it be assumed that the photographer has fixed at eight the number of pictures for recording a certain event. Later, for example during the photographing of the event, the photographer concludes that eight pictures will not suffice and that it will have been, for example, the tenth photograph which will have been the critical one. In heretofore known devices, the fact that the photographer recognizes this at this time will do him no good, because the time it takes to switch over the camera to take a further series or even to switch over the camera for individual pictures will be much too long so that the instant at which the critical picture should have been taken is long past.

With this in mind it is the primary object of the present invention to provide for overcoming the disadvantages of the prior art.

Another object is to provide a camera drive which allows the changing of the number of pictures in a series even after the series has begun.

These objects and others ancillary thereto are accomplished in accordance with the preferred embodiments of the invention wherein the separate release for the drive, which is conventionally arranged at the housing of the drive mechanism, has operatively associated with it mechanical means which partake of the release movement and which, upon renewed actuation of the release, after the running-off of the series of pictures, move the series picture-counting device, which is in a position in which it opens the switch, into a position in which the switch is again closed.

According to a preferred embodiment, the series picture-counting device is fashioned as a rotary disc and is provided with a switching element which, when the disc passes through its null or zero position, sweeps along a contact in the motor circuit and opens the same, while at the same time an arm which is also on or carried by the disc comes into engagement with a pull rod or strut which itself is controlled by the release. The pull bar is connected with the release, if desired by means of intermediate levers, in such manner as to move to and fro together therewith. The length of the stroke is such that when there occurs a stroke after the falling-in of the arm, that is to say, after the interruption of the motor circuit at the end of a series of pictures, the switching element is pivoted so as to be out of engagement with the switch so that the latter is once again closed.

Thanks to the present invention, the photographer can, after the predetermined number of pictures of the series has been run through, cancel the switching-off of the motor by once more actuating the release thereby to continue the serial picture taking. This occurs since the switch at the camera which changes the camera over between operation for taking individual pictures and for taking a series of pictures has not been actuated and thus still is in the series picture-taking position. All that the photographer has to remember is that this serial picture-taking will continue so long as the photographer holds the release depressed. This can, if necessary, continue until the film is exhausted.

Additional objects and advantages of the present invention will become apparent upon consideration of the following description when taken in conjunction with the accompanying drawings in which:

FIGURE 3 is a schematic view of the supply-counting device and the series picture-counting device in a first operating position in which they are disposed when film is loaded into the camera.

FIGURE 4 is a view similar to FIGURE 3 showing the position into which the device is placed after film has been loaded into the camera.

FIGURE 5 is a view similar to FIGURE 4 showing the device after it has been set for automatically taking a series of pictures.

FIGURE 6 is a view similar to FIGURE 5 showing the device after a sequence of pictures has been taken automatically.

FIGURE 7 is a fragmentary view showing a detail of the pull bar.

Figure 1:
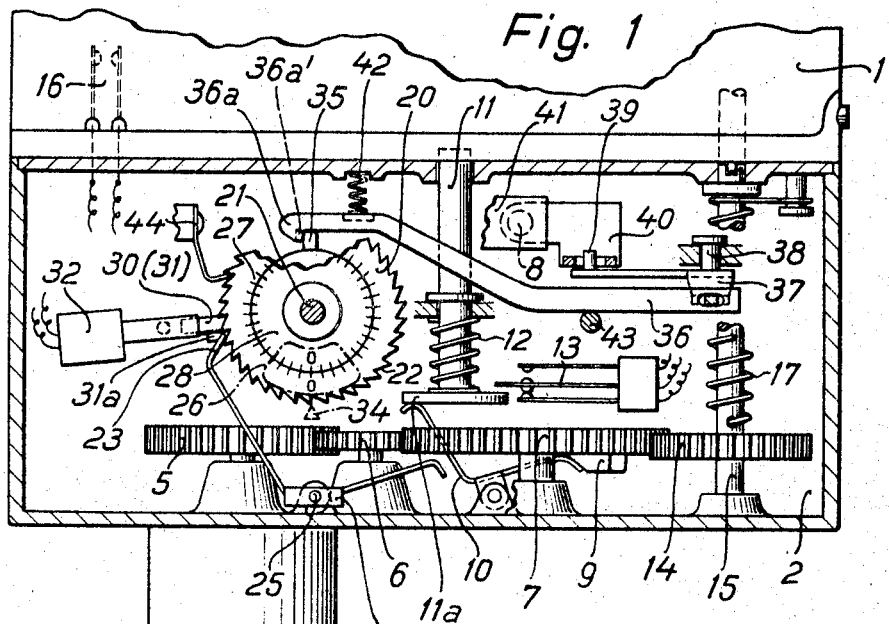
FIGURE 1 is a schematic vertical cross-sectional view of the structure of a motor drive and illustrating the supply picture-counting device and the series picture-counting device, the same being equipped with the switching mechanism according to the present invention.

With more particular reference to the drawings, FIGURE 1 shows a camera housing 1, to which the drive housing 2 is connected, the drive housing 2 containing the drive mechanism. The drive mechanism is driven by a motor 4 which is connected by means of a flange to the underside. The motor 4 carries a pinion 5 which is in mesh with an idler gear 6, the latter being in mesh with a gear 7.

The drive functions as follows: when the release or trigger button 8 (FIGURE 2) is pressed, the motor circuit is closed, whereupon the motor 4 is energized and the gear 7 is caused to rotate in the direction of the arrow A. The underside of the gear 7 carries a cam 9 (FIGURE 1) by means of which a lever 10 is pivoted, in clockwise direction, as soon as the cam 9 engages this lever. The clockwise pivoting of the lever 10 raises a plunger 11 against the force of a compression spring 12. This movement of the plunger 11 releases the shutter of the camera. At the same time, a flange 11a carried by the plunger 11 engages one arm of a switch 13, which arm extends into the path of the upward movement of the flange 11a. This causes the switch 13 to be opened, which at first causes the rotation of the gear 7 to stop since this switch is in the motor circuit.

In the course of this operation, the gear 7 has rotated through an angle α and a part of its circumference is free of teeth throughout an angle α. This gap in the teeth is, in the starting position of the gear 7, opposite the gear 14 which is mounted for rotation with a shaft 15. The upper end of this shaft extends through the drive housing 2 and is coupled, if desired, through the intermediary of idler gearing, with the shutter cocking and film transport mechanism of the camera.

After the shutter in the camera has been released, a switch 16 is closed by an element which is moved by the closing of the shutter, this switch being connected in parallel with the switch 13 so that the gear 7 again begins to run so that its teeth will come into mesh with those of the gear 14. In this way, the shaft 15 is rotated against the force of spring 17 and the film is caused to be transported and the shutter is cocked.

At the end of this operation the plunger 11 is inside the camera released to return to its starting position in which it again interrupts the motor current circuit, in a manner known per se and not illustrated. As soon as the gear 14 is again adjacent the gap of the teeth of the gear 7, that is to say, at the end of the cocking of the shutter and wind-up of the film transport mechanism, the gear 14 will, under the influence of the spring 17, also again return to its starting position, so that the camera is ready for a new releasing.

For taking a series of pictures the drive mechanism incorporates a switch 18 (FIGURE 2), the same being fashioned as a ring and being arranged at the front side of the drive housing 2 concentric to the release 8. When the switch is connected to "series," the above-described switching-off of the motor circuit at the end of the shutter cocking and film transport operation is eliminated and the motorized shutter releasing and winding-up of the camera repeats itself so long as the release 8 is maintained in the pressed position, or until the series picture-counting device interrupts the motor circuit via a separate switch.

The picture-counting devices are arranged at the rear wall of the drive housing 2, these picture-counting devices including the above-mentioned series picture-counting device and the supply picture-counting device. The latter includes a disc 20 which is freely rotatable about a hub 21. The outer edge of the disc 20 is provided with saw teeth 22 which are engaged by a switching pawl 23, the latter being part of a two-armed lever 24. The other arm of the lever 24, which lever is pivotable about the axle 25, reaches into the region of cam 9 of the gear 7 in such a manner that for each revolution of the gear 7 the lever 24 is pivoted once. In this way, the lever advances the disc 20 by one tooth. The disc 20 carries on one of its sides, namely, a side which is visible through an opening 26, a scale 27 which is divided into a number of intervals that correspond to the number of pictures which the film can take, that is to say, 20, 36 or 40, or the like.

A disc 28 is integral with the hub 21, this disc 28 being part of the series picture-counting device. The diameter of disc 28 is smaller than that of disc 20 and is arranged immediately ahead of the disc 20, considered in the direction from the opening 26. The disc 28 is subdivided into the same number of intervals as the disc 20.

The structure further comprises a friction clutch 29 which is effective between the disc 20 and hub 21 or the disc 28. By means of this friction clutch 29 whenever the disc 20 is advanced by one tooth, the disc 28 is carried along in the same direction. The disc 20 also is provided with an arm 30 and the hub 21 is provided with an arm 31 the latter having a bent-over flap 31a, so that there is formed an abutment type connection between the hub 21 or disc 28 and the disc 20. This connection becomes effective when, for purposes of setting the two discs, the hub 21, which is accessible from the outside of the drive housing 2, is rotated.

The two discs 20 and 28 furthermore coact with the switch 32 which, as the other switches, also lies in the electric circuit of the motor 4 and is normally closed. When the switch 32 is opened, the current to the motor is interrupted thereby turning the motor off.

The switch 32 is opened by means of the above-mentioned arms 30, 31. Both of these arms pass, upon rotation, between the tongues of the switch 32 and cause the contact nipples to be separated thereby to open the switch. The arrangement is such that each of the arms 30, 31, individually as well as the two arms together can open the switch 32. The scales of the discs 20, 28, and the arms 30, 31 are arranged in such a position relative to each other that the switch 32 is opened when the zero or null points of the two scales are in alignment with index 34, as shown in FIGURE 3.

Figure 2:
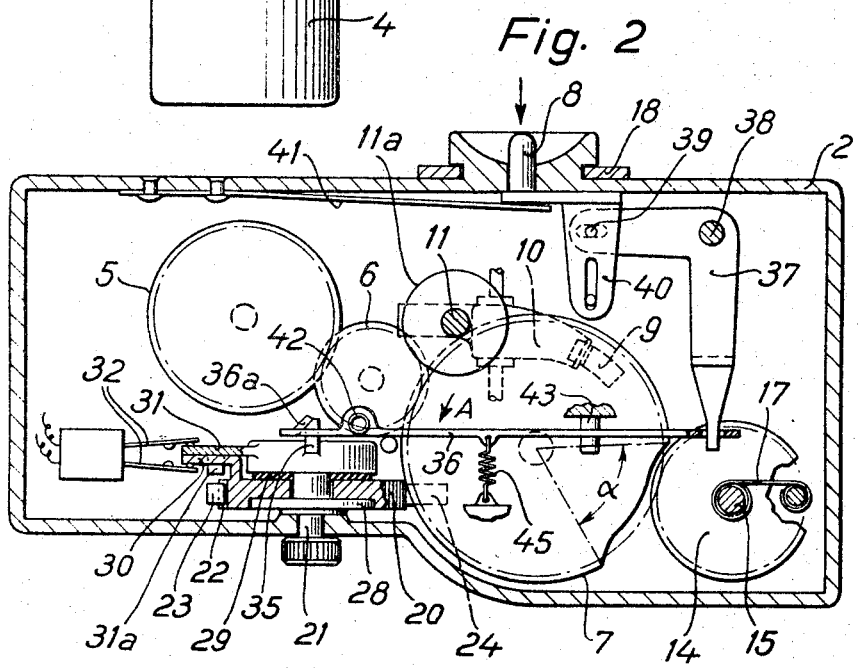
FIGURE 2 is a view similar to FIGURE 1 but taken horizontally and showing the switching mechanism according to the present invention.

There will now be described the elements by means of which one can again actuate the motor release of the camera as well as the shutter cocking and the film transport wind-up. The hub 21 is provided with yet another arm 35 which is connected with the hub for rotation therewith, this arm 35 extending radially to the axis of the hub to a point at about the height of the teeth 22, the arm being angled into the interior of the housing (FIGURE 2). The angled-in part of the arm 35 coacts with a pull bar 36 which extends parallel to the rear wall of the housing and which is formed at one end with a hook 36a. The other end of the pull bar 36 is provided with an opening into which extends a bell crank lever 37, the latter forming a connection between the release 8 and the pull bar 36. The bell crank lever is pivotable about a stationary pivot 38 and carries a pin 39 which extends into an elongated slot of a slide 40, the latter being fixedly connected to the release 8. A leaf spring 41 acts on the release 8 and maintains the same in its non-actuated position.

The pull bar 36 is under the influence of the force of a spring 42 which tends to tilt the pull bar 36 downwardly, as viewed in FIGURE 1, into a position in which the pull bar abuts against the stationary abutment 43.

The supply counting device and the series picture-counting device function, in conjunction with the pull bar 36, the bell crank lever 37 and the slide 40, as follows:

As soon as possible after the film has been put in the camera, the photographer will set the scale 27 to the figure which corresponds to the number of pictures which can be taken by the film, for example 20. That is to say, the photographer sets the camera from the position shown in FIGURE 3 to that shown in FIGURE 4. This is done by taking the hub 21 and rotating the same in the direction of the arrow B of FIGURE 3. In so doing, the flap 31a of arm 31 of the hub 21 comes into engagement with the arm 30 of the disc 20 so that by means of this abutment type connection the disc 20 is carried along.

If, now, the film is exposed for individual pictures, the lever 24 wil pivot, in clockwise direction, once for each single frame movement of the film transport. In the course of this, the pawl 23 will rotate the disc 20 by one tooth, also in clockwise direction, i.e., in the direction of the arrow C shown in FIGURES 3 to 6, and the disc 20 will, via the friction clutch 29, carry along the hub 21 and therefore move the disc 28. Insofar as the person viewing the scales through the opening 26 is concerned, the markings will advance step by step from 20 down to 0, the advance always being by one position. When the scales arrive in the 0 position, the arms 30, 31 will slide between the tongues of the switch 32 and separate the contacts thereof.

It will now be explained how the counting takes place for counting series of pictures. Let it be assumed that, after the eighth picture has been taken, the photographer wants to take a series of six photographs. For this purpose, the photographer must first change over the switch 18 at the front wall of the housing to "series," thereby changing over the electrical circuit. Furthermore, the photographer has to set the mark "6" of disc 28 to be in alignment with the index 34, this being done by the hub 21. In the course of this, the position of the disc 20 remains unchanged because it is held in its position by the detent spring 44. At this time it is the reading of "12" of the disc 20 which is in alignment with the index 34 inasmuch as eight pictures have already been taken so that but twelve pictures remain. The arm 31 which is connected for rotation with the hub and disc is thereby brought into a position which is spaced six steps from the contact 32 (see FIGURE 5). Here it will be borne in mind that the disc 28 is rotated in counter clockwise direction, that is to say, it is turned back insofar as the settings made heretofore are concerned. In order that the scale reading "6" can come into alignment with the index 34, the arm 31 has to move through the tongues of the switch 32, during which the switch is momentarily opened. However, since the switch is closed immediately thereafter, this has no influence on the operation.

With each rotation of the hub 21 in counter clockwise direction in which the arm 35 moves past the hook 36a, these two parts come together and the hook 36a would, at that point, prevent rotation, but for the provision of special means which prevent this. For this reason the hook 36a is, at its inner hook surface, bent at an angle of 45° with respect to a part 36a'. Similarly, the bent-over flap of the arm 35 is doubled at its leading edge at an angle of 45° (FIGURE 7). These two oblique surfaces are opposite each other. Therefore, when the hub 21 is turned back, the relatively large finger force is able to displace the pull bar 36, in the direction of the objective, against the force of the spring 45, whereas in the opposite direction of rotation, the pull bar 36 can easily take the arm 31 along.

After the six switching steps have been run through upon completion of the series of pictures, during the course of which the photographer holds the release 8 in the depressed position, the arm 31 opens the switch 32 so as to turn off the motor.

However, during the time when the arm 31 approaches the contact 32, the bent-over part of the arm 35 has during this time run up against the oblique surface of hook 36a of the draw bar 36. The latter is tilted, in clockwise direction, against the force of the spring 42 about the point of engagement of the belt crank lever 37 at its other end. At the instant at which the arm 31 opens the switch 32, the arm 35 is about the middle of the mentioned oblique surface (FIGURE 6). If, now, the photographer thinks that the pictures which were taken in the series are not sufficient, all he has to do is to let go of the release and to press it anew. When the release is let go, the pull bar is moved to the left, as viewed in FIGURES 1 and 6, as a result of which the hook 36a falls behind the arm 35. If the release is then once again actuated, the pull bar 36 is now moved in the opposite direction to the right. In the course of this, the hook 36a pulls the arm 35 along and thus swings the arm 31 out of the region of the tongues of the switch 32 which now again closes so that the motor current continues to flow. Inasmuch as the change-over switch 18 is still in the position "series," the serial photographing will continue and this will go on until the photographer lets go of the release 8. In this way the photographer can neutralize or cancel the automatic switching-off of the motor after the predetermined number of pictures has been taken, and he can take as many photographs in series as it appears necessary to him in order to photograph whatever it is he wants to photograph.

In the same way, the arm 31 is brought out of the region of the tongues if the photographer considers the series of photographs taken to have been adequate and changes the change-over switch to "individual pictures." When the next individual picture is taken, the above-described operation where the hook 36a falls behind the arm 35 takes place when the release 8 is let go, as well as the further swinging of the arm 31 when the release is actuated the next time.

In the above-described individual picture counting by means of the disc 20 it was assumed that the arms 30, 31 were parallel to each other during the movement of the disc. This is also possible when the disc 20 is set with its scale onto the number of possible pictures available in the film, because it is only when the arms 30 and 31 are parallel to each other, that there is obtained the abutment type connection which brings about the carrying along of the disc 20. However, the arms 30 and 31 can be made non-parallel if unintentionally the hub 21 is rotated in counter clockwise direction. Should this backward turning, of which the arm 31 of course takes part, occur beyond the switch 32, the arm 31 could, for example, assume a position as shown in dashed lines in FIGURE 4. For single picture taking, the arm 31 then reaches the switch before the arm 30 does and this will turn the motor off. But here, the hook 36a will also fall behind the arm 35 and the hub 21 with the arm 31 will be turned further the next time the release is actuated, so that there will be no interruption in the single picture taking. Furthermore, this operation takes place automatically, that is to say, without the photographer noticing it.

Figure 8:
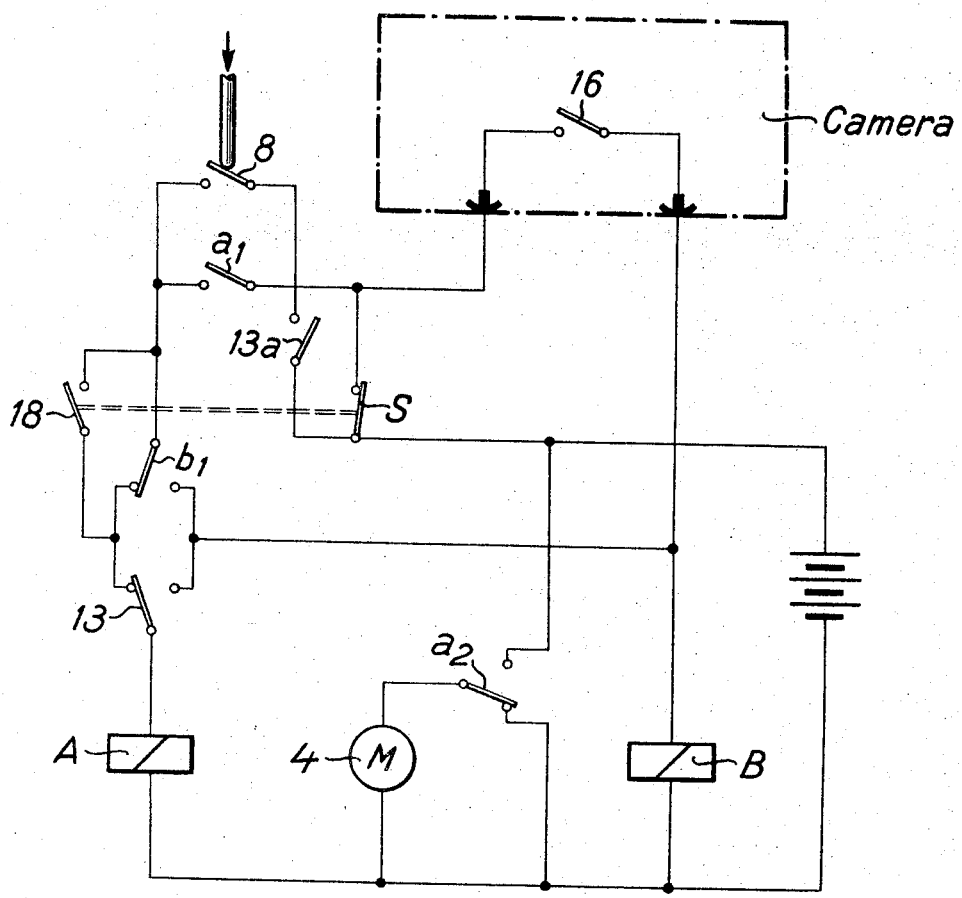
FIGURE 8 is a circuit diagram of the motor circuit.

It will now by way of the wiring diagram (FIG. 8) be explained how the various switches cooperate to control motor 4. These switches operate in connection with two relays A and B and their respective contacts $a_1$, $a_2$ and $b_1$ which have not been mentioned up to now, for sake of clarity and simplicity.

For exposure of individual pictures the release or trigger button 8 is pressed which results in energizing relay A. Contact $a_1$ is thus closed, contact $a_2$ is switched into its upper contact position whereby motor 4 is connected to the battery. This leads to a rotation of gear 7, as a result of which plunger 11 is raised to release the shutter of the camera. The flange 11a of plunger 11 at the same time contacts switch 13 and causes it to be switched into its right hand contact position. Relay A is thereby de-energized, its contact $a_2$ falls back into its lower contact position cutting motor 4 off its power supply.

At the end of the shutter operation switch 16 is closed for instance by the lagging shutter blind if the camera is provided with a focal plane shutter. Should the camera be equipped with the leaf type between the lens shutter some other element that is moved during the shutter run-off may serve to close switch 16. Relay B is energized by said closing of switch 16 and its contact $b_1$ is switched to its right hand contact position. This serves to re-energize relay A since switch 13 also is in its right hand contact position. Contact $a_1$ is therefore closed and contact $a_2$ switched to its upper contact position.

Motor 4 becomes again connected to the battery and starts to rotate. Gear 7 therefore also starts to rotate and starts to cock the shutter and wind up the film transport. Cocking the shutter means transporting its movable elements back to their starting position whereby of course switch 16 is opened. Motor 4 and gear 7 continue to rotate until at the end of the shutter cocking and film transporting operation plunger 11 is lowered to its initial position.

This causes switch 13 to be re-switched to its left hand contact position and thus relay A to be deenergized. Contact $a_1$ is therefore opened and contact $a_2$ moved to its lower contact position in which motor 4 is again cut off the battery and is forced to a stop.

Since contact $a_1$ is opened and trigger button 8 is released relay B is deenergized also. Should the trigger button 8 be kept pressed down relay A will still be deenergized as this deenergization is not dependent on the position of button 8. Therefore contact $a_1$ will be open, relay B will, however, remain energized as long as button 8 remains in its actuated position. A new release can only be accomplished by letting go of button 8 (whereby relay B is deenergized) and by newly pressing it.

For taking a series of pictures switch 18 has to be actuated prior to pressing release button 8. This causes contact $b_1$ to be shunted and at the same time opens a switch S which lies in parallel to switch 13a. The latter which for sake of simplicity is not shown in FIGS. 1–7 is also actuated by plunger 11, however in such way that it is opened for a short period of time only whenever plunger 11 travels upwards or downwards. Switch 13a serves to deenergize relay B at the end of each cycle. It will be noted that switch 13a is opened also when plunger 11 is raised, since at that time, however, relay B is not energized, the opening of switch 13a during this phase has no effect.

Connecting switch 18 to "series" and pressing the release button 8 has the effect that motor 4 and mainly gear 7 do not stop in their starting position but continue to rotate. Thus pictures are taken as long as release button 8 remains pressed. This is due to the fact that relay A is not deenergized any more at the end of each cycle since $b_1$ is shunted by switch 18.

It has been mentioned before that upon raising plunger 11 the shutter is released and switch 13 is switched to its right hand contact position which deenergizes relay A, opens contact $a_1$ and brings contact $a_2$ to its lower contact position, thereby stopping motor 4. Upon closing switch 16 at the end of the shutter run-off period relay B is energized to contact $b_1$ to its right hand contact position which serves to reenergize relay A, since now also switch 13 is in its right hand contact position. Motor 4 therefore starts again to rotate. At the end of the cycle, i.e. at the end of the shutter cocking and film transporting operation, the descending plunger 11 flips switch 13 back to its left hand contact position.

Normally this would result in deenergizing relay A and stopping the motor 4, since the circuit of relay A is then interrupted by the contact $b_1$ which still is in its right hand contact position. As, however, under "series" conditions $b_1$ is shunted by switch 18 relay A remains energized to the effect that motor 4 continues to operate. Relay B remains energized by way of contact $b_1$. In order to deenergize relay B for the next cycle it is necessary that switch 13a be opened for the above mentioned short period of time. This is done by the descending plunger 11 which passes by switch 13 with its flange 11a in a manner not further illustrated. Thereby both relays A and B are deenergized, however, upon reclosing of switch 13a relay A is again energized, thus starting a new cycle.

The above mentioned function is performed as long as release button 8 remains actuated. However, the function may also be interrupted by opening switch 32 which lies in series with the switch of release button 8. As described before it is this switch 32 that is opened at the end of taking a preselected number of pictures by arm 31 or at the end of the film supply by arm 30.

It will be understood that the above description of the present invention is susceptible to various modifications, changes and adaptations, and the same are intended to be comprehended within the meaning and range of equivalents of the appended claims.

What is claimed is:
1. A drive device for a camera for releasing the shutter and advancing the film transport, comprising, in combination:
an electric motor for connection with a camera to cock and release its shutter and advance its film transport;
an electric circuit for energizing said motor and including a shut-off switch for deenergizing said motor when a preselected number of pictures have been taken;
a trigger for energizing said circuit while the trigger is actuated;
a picture counting assembly for opening said shut-off switch after a preselected number of pictures have been taken; and
means connected between said release and said counting assembly for closing the shut-off switch and thereby energizing the motor, after such switch has been opened by said counting unit, by releasing said trigger and actuating it again.

2. A device as defined in claim 1 wherein said means are mechanical and partake in the movement of said triggger.

3. A device as defined in claim 1 wherein said picture counting assembly includes a picture supply counter, and a series picture and preselection counter.

4. A device as defined in claim 3 wherein said means includes a pull bar, intermediate levers connected between said pull bar and said trigger for providing the pull bar with to and fro movement when the trigger is released and actuated and said series picture and preselection counter includes a rotatable first disc having a first arm which is positioned to move past said shut-off switch when the disc passes through its zero position and a second arm which, in the zero position of the disc engages said pull bar so that during the stroke of the bar after the disc is in its zero position said disc is moved so that said shut-off switch can close.

5. A device as defined in claim 4 wherein said supply counter includes a second disc having an arm positioned for opening said shut-off switch in the zero position of said second disc.

6. A device as defined in claim 5 wherein said second disc is coaxial with said first disc, and a friction clutch for connecting said discs for rotation together.

7. A device as defined in claim 6 wherein said discs are freely rotatable, a pawl for moving said second disc by one picture increment for each actuation thereof, drive means connected to said motor for connection with a camera to cock and release its shutter and advance the film transport and for moving said pawl each time a picture is taken.

8. A device as defined in claim 7 comprising a housing in which all of the above recited elements are disposed, said first disc having a part projecting exteriorly of said housing by which said first disc may be manually rotated, the first arm of said disc having an abutment for engaging said arm of said second disc and carrying it along when the counter assembly is set by said projecting part.

References Cited

UNITED STATES PATENTS

| | | | |
|---|---|---|---|
| 2,969,722 | 1/1962 | Schwartz | 95—31 |
| 3,064,522 | 11/1962 | Fukuoka | 95—31 |
| 3,135,184 | 6/1964 | Hintze et al. | 95—31 |

NORTON ANSHER, *Primary Examiner.*

R. A. SCHROEDER, *Assistant Examiner.*